Dec. 20, 1966 L. R. ALLEN ETAL 3,293,076

PROCESS OF FORMING A SUPERCONDUCTOR

Filed April 17, 1962 2 Sheets-Sheet 1

*INVENTORS.*
LLOYD R. ALLEN
JOHN G. RUPP
ROBERT A. STAUFFER

PROCESS OF FORMING A SUPERCONDUCTOR

Filed April 17, 1962 2 Sheets-Sheet 2

INVENTORS.
LLOYD R. ALLEN
JOHN G. RUPP
ROBERT A. STAUFFER
BY

United States Patent Office 3,293,076

Patented Dec. 20, 1966

3,293,076

PROCESS OF FORMING A SUPERCONDUCTOR

Lloyd R. Allen, Belmont, John G. Rupp, Reading, and Robert A. Stauffer, Weston, Mass., assignors, by mesne assignments, to National Research Corporation, Cambridge, Mass., a corporation of Massachusetts Filed Apr. 17, 1962, Ser. No. 188,177
1 Claim. (Cl. 117—213)

The present invention relates to a novel article of manufacture and process for forming such an article.

The invention is more particularly directed to wire, strip and other formed materials useful as superconductors and particularly to materials capable of maintaining superconductivity in very high magnetic fields.

The copending application of Allen and Stauffer, S.N. 133,653, filed August 24, 1961, now abandoned, teaches a new process of forming superconductive wire or strip by reacting adjacent layers of niobium and tin. We have discovered that the time of treatment in said process and resultant product can be improved.

Accordingly, it is a principal object of the present invention to provide an improved process of making superconductive wire or strip of the type described in said copending application.

Still another object of the invention is to provide a process for producing ductile superconductors which combines accurate control of the manufacturing parameters with simplicity of operation.

These and other objects of the invention will in part be obvious and will appear hereinafter.

The present invention accordingly comprises the process involving the several steps and the relation and the order of one or more of such steps with respect to each of the others which are exemplified in the following detailed disclosure and the scope of the application of which will be indicated in the claims.

For a fuller understanding of the nature and objects of the invention, reference should be had to the following detailed description taken in connection with the accompanying drawings wherein.

Figure 1:
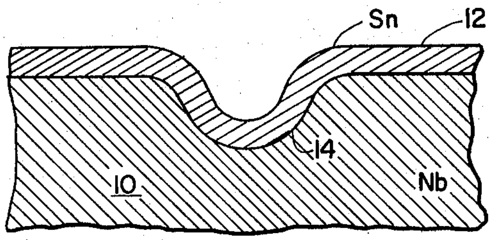
FIG. 1 is an enlarged, diagrammatic, schematic, partially sectional view of one embodiment of the invention at the start of the process of Example 1.

The present invention is directed to the production of a superconductive element, such as a wire, which has a high tolerance to magnetic fields and which is ductile to permit bending for the formation of electromagnets and the like.

In a preferred embodiment of the invention, the element is a niobium wire having a superconducting niobium-tin coating thereon. This superconducting coating is arranged to give a continuous path along the wire having no portions thicker than about 2000 angstroms. Even better results are obtained when no portion of the superconducting path is thicker than 1000 angstroms. When the coating is a continuous coating over the whole surface of the wire, various portions of the coating may be much thicker than the desired 1000 or 2000 angstroms. However, in order that the wire have high magnetic field tolerance, it is essential that these thicker portions be bypassed by thin portions so that there is, from one end to the other of the wire, at least one continuous path which can be traced along portions of the coating, all of which are thinner than 2000 angstroms. In any practical wire it has been found that there are a large multiplicity of individual paths extending along a given wire. These paths, in many cases, have generally random directions, branching and joining again. However, any portion of the coating which has requisite thinness can act as the superconductor with high magnetic field tolerance so long as it is connected to other similarly thin conductors.

From the standpoint of understanding the invention, it is probably simpler to consider it as being the opposite of the normal thickness-conductivity relationship for a normal conductor. For example, if a copper coating is applied to a nonconducting wire, the current-carrying capacity of the wire is limited by the thinner portion of wire. In the case of the present invention, the current-carrying capacity, in a high magnetic field, is limited by the presence of those thicker portions which interrupt the thin superconductive paths.

The product of the present invention is preferably produced by providing a tin coating, for example, on a thin niobium wire. This wire is then heat-treated to convert the tin coating to a thin layer of $Nb_3Sn$ superconductor compound. Since tin does not readily wet niobium, and since this reaction must take place at a temperature above the melting point of tin, there are problems in carrying out this compound formation. As the tin reaches its melting point, it will tend to contract into small beads or drops on the surface of the wire. This leaves portions of the wire with no tin and other portions with a great excess of tin.

In the present invention, this difficulty has been circumvented in several ways. In one method, the wire is scored to provide grooves extending along the wire. These grooves tend to collect the beads of tin which would otherwise be randomly distributed along the wire. The grooves thus serve to trap continuous thick portions of molten tin extending along the wire. As further heating of the wire continues, molten tin reacts with the niobium wire to form a $Nb_3Sn$ interface which is wet by tin. The liquid will then climb up the sides of the grooves and will react with, and wet, the surface of the wire between the grooves. As the liquid creeps out of the grooves and spreads between the grooves, it forms thin layers of niobium-tin compound which extend from one end of the wire to the other. These thin continuous layers which exist between the grooves act as the superconducting paths of high magnetic field tolerance.

In another embodiment of the invention, the whole surface of the wire is roughened to form the mechanical barriers to the collection of the molten tin into large, widely-separated droplets. Thus, even though there is some formation of droplets, they are of much smaller size and are more nearly completely distributed over the surface of the wire. In this case, the forming niobium-tin compound spreads out over the niobium wire from each small droplet to provide thin continuous paths surrounding the various droplets and extending from one end of the wire to the other.

In still another modification of the invention, the niobium wire is exposed to tin vapors for a very short time to deposit on the wire a layer of tin of only a few molecules thick. This wire is then heat-treated to form a wire whose surface molecules have been converted to niobium-tin compound. In this case, the layer of tin applied to the wire is sufficiently thin that the bonding forces between the molecular tin layer and the niobium substrate is greater than the cohesive force tending to form tin droplets. Accordingly, the tin will stay in its deposited position for a sufficiently long time to react with the niobium and thus provide a niobium-tin compound surface which can be wet by molten tin.

In another embodiment of the invention the niobium wire is dipped in a bath of molten tin. At a temperature above the melting point of tin, the tin will diffuse into the niobium and will form a niobium-tin surface whose thickness depends upon the time that the wire is in the molten bath. However, this technique provides a relatively thick coating of tin remaining on the wire. This extra tin is then removed by mechanical means, such as wiping, or by electrical means, such as "back plating." Thereafter the wire, with the remaining thin layer of tin, can be heat-treated to form the thin (<2000 A.) layer of $Nb_3Sn$ without difficulty with nonwetting problems.

In all of the techniques described above, the thin continuous niobium-tin superconductor layers are formed by heating the tin-coated niobium in a vacuum (or inert atmosphere) furnace while at temperatures between 800 and 1100° C. for a time between 5 and 100 hours.

For the purpose of illustrating several preferred embodiments of the invention, there are set forth below a number of nonlimiting examples.

*Example 1*

Three pieces of niobium wire having a diameter of 10 mils (0.010 inch) where scored longitudinally by pulling them across an emery paper of #50 grit. This produced a number of grooves extending along the wire, the grooves having a depth ranging up to 1 mil. These wires were then electroplated in a standard tin electroplating bath for times of 5, 7½ and 10 seconds, respectively. These times are proportional to the thickness of the tin layers. The coated wires were then coiled on a tantalum spool and the coil was wrapped in a sheet of tantalum. This was then inserted in a vacuum furnace and heated under an absolute pressure of $0.1 \times 10^{-3}$ Torr for 18 hours at a temperature of 970° C.

*Example 2*

Three more pieces were prepared in a fashion identical to Example 1 except that instead of scoring with emery paper the wires were scored by pulling across a mill file having 40 teeth per inch.

*Example 3*

Three more pieces were prepared in a fashion identical to Example 1 except that the wires were scored both by emery paper as in Example 1 and by a mill file as in Example 2.

The results of the tests on these nine samples are shown in Table 1. The wires show large values of critical currents in fields of 10,000 gauss. They only show a small decrease in critical current as the field is increased from 10,000 gauss to 14,000 gauss. In each series of three wires, the critical current is greatest for the thinnest film and least for the thickest film.

TABLE 1

Critical Current (amps)

| Plating Time | Filed | | Sanded | | Filed and Sanded | |
|---|---|---|---|---|---|---|
| | 10,000 Gauss | 14,000 Gauss | 10,000 Gauss | 14,000 Gauss | 10,000 Gauss | 14,000 Gauss |
| 5 sec | 6.9 | 5.6 | -------- | -------- | 8.3 | 7.14 |
| 7½ sec | 2.9 | 2.2 | 16.1 | -------- | 6.5 | -------- |
| 10 sec | 2.1 | -------- | 10.8 | 7.5 | 2.4 | 1.8 |

Figure 2:
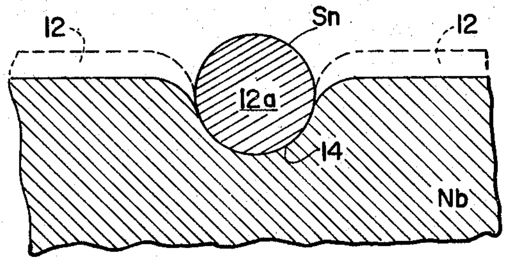
FIG. 2 is an enlarged view similar to FIG. 1 at a later stage in the process.
Figure 3:
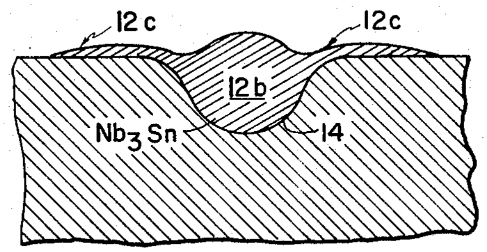
FIG. 3 is an enlarged sectional view similar to FIG. 2 at a still further stage in the process.

The mechanism by which the superconducting paths of high magnetic field tolerance is formed in Examples 1 through 3 is believed to be illustrated by FIGS. 1 through 3. In FIG. 1 a portion of the surface of a grooved niobium wire 10 is illustrated as having a thin, relatively uniform tin layer 12. In FIG. 1 the groove 14 is shown as being about 1 mil, while the coating of tin 12 is shown as about ¼ mil. In FIG. 2 the condition of the wire is illustrated after the wire has been heated to melt the tin. Here most of the coating 12 has essentially disappeared, as shown by dotted lines, and all of the tin has collected at 12*a* (in the groove 14) due to the high surface tension of the molten tin. In FIG. 3 (on completion of the heat treatment) the mass of tin in the groove 14 has been completely converted to niobium-tin compound and some of the tin has moved out of the groove 14 to wet the adjacent areas and form thin films 12*c* of niobium-tin compound. These areas 12*c* make continuous paths along the wire to serve as the superconducting paths of high field tolerance.

*Example 4*

In order to study the mechanism of formation of the $Nb_3Sn$ surface of the present invention, certain experimental work was carried out in a glass furnace which permitted microscopic examination of the tin-coated wire while it was heat treated under argon. In this case, the wire was heated by direct resistance. When such a wire (having a layer of tin electroplated on the niobium base) is heated to start the diffusion process the tin, when it reaches the melting point, forms droplets. The size and distribution of the droplets vary widely with the condition of the wire surface. If the surface is very smooth, very large drops are formed and in extreme cases drain off the wire. If the wire is rough, small well-distributed drops, sometimes almost too small to see at 60×, are formed. There is some reason to believe that the treatment of the wire in the last stages of manufacture may also influence the drop formation. It also appears that a mechanical abrasion of the wire just prior to plating leads to small well-distributed drops.

As temperature is increased during drop formation, a point is finally reached where the tin begins to wet the niobium and to spread over the surface. This spreading which starts around 800° C. occurs slowly at low temperatures but much more rapidly at higher temperatures. In the same temperature range where spreading occurs, tin begins to react with niobium. This reaction occurs more rapidly as temperature increases and at temperatures around 1100° C. the reaction is so rapid that little spreading occurs before reaction is complete.

These observations would suggest that the use of low temperatures would be desirable to get maximum distribution of tin over the surface of niobium. There is probably a limitation to this approach since it is believed that below 900° C. niobium and tin react to give $Nb_2Sn_3$ or $Nb_3Sn_2$ rather than $Nb_3Sn$. However, when operating in vacuum, $Nb_3Sn$ has been made repeatedly at 800° C. and this vacuum heat treating temperature can give very good superconducting properties. It is likely that the reduced pressure permits conversion of $Nb_2Sn_3$ or $Nb_3Sn_2$ to $Nb_3Sn$ by removal of tin vapor at temperatures lower than possible at a full atmosphere of argon.

Based on these findings, it is believed that the superconducting properties produced by heat treating tin-plated niobium result from the spreading of droplets formed during heating to meet and form a network of very thin conducting paths of $Nb_3Sn$. The drops formed on smooth wire used in certain tests are large and a long time and low temperatures are necessary to get good spreading. Since the drops are large relative to the diameter of the wire, the chances of having very thick places or nearly bare places along a wire are good and the performance of such a wire would be expected to be erratic. In preferred embodiments, abrasive methods of cleaning, such as scoring with emery or rubbing with steel wool prior to plating, give much improved drop patterns. The drops in these cases can be made very small and are well distributed.

In order to obtain consistent results in the final product, it is preferred that the last stage of the wire drawing be carried out under careful control so as to provide a minimum of surface contamination. In this last stage, the wire can be grooved or otherwise roughened so as to provide a surface having very small continuous grooves or other microscopic indentations which permit formation of very small droplets of tin during melting.

*Example 5*

In this embodiment of the invention the surfaces of a number of 10-mil niobium wire samples were uniformly roughened by rubbing with steel wool. The wires were then electroplated as in Example 1 to give a tin coating of about $2\times10^{-4}$ cm. thickness. These wires were then heated in argon for about 30 minutes at a temperature ranging from 949° C. to 960° C. The average resultant critical currents, as a function of magnetic field, were measured as set forth in Table II.

TABLE II

| Magnetic field strength: | Critical current |
|---|---|
| 5 kilo gauss | 15 to 20 amps. |
| 7½ kilo gauss | 6 to 11 amps. |
| 10 kilo gauss | 5 to 7 amps. |
| 12 kilo gauss | 4 to 6 amps. |
| 13 kilo gauss | 3 to 5 amps. |

Figure 4:
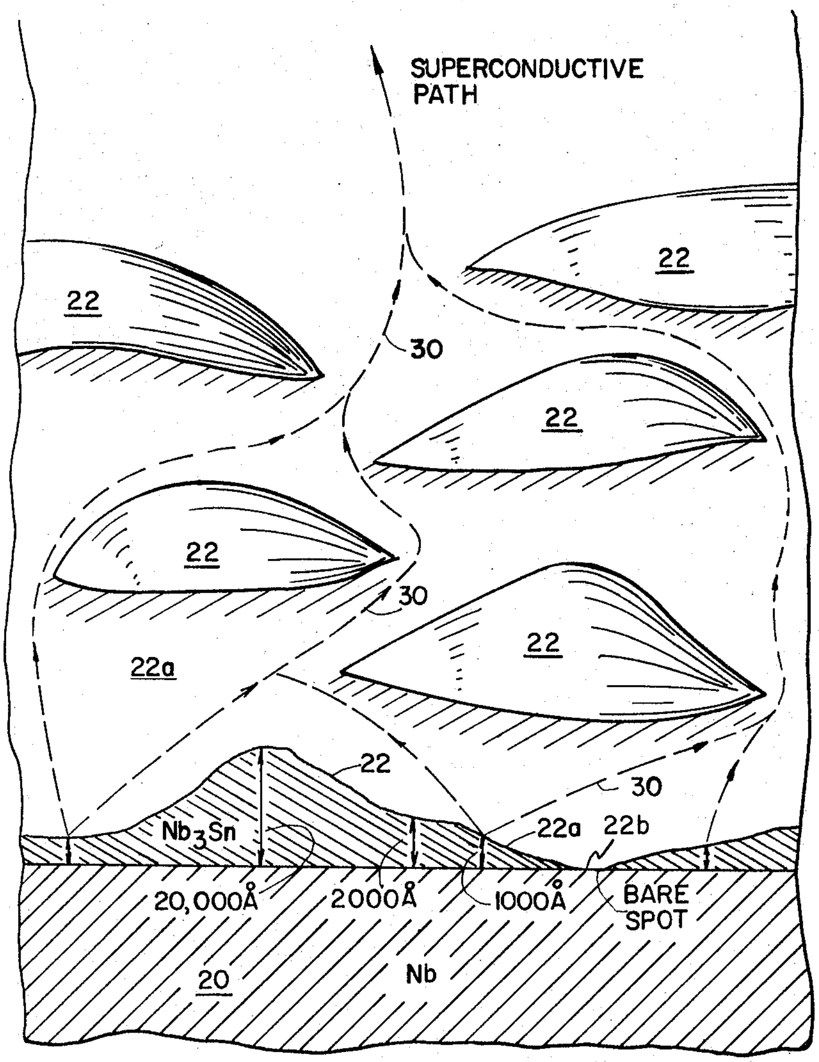
FIG. 4 is a greatly enlarged sectional view of modified product produced by the process of the present invention.

The wires of Examples 1 through 5 are believed to have structures of the type illustrated in FIG. 4 which is a greatly enlarged, schematic, sectional view of a portion of the surface of a completed wire. In this figure the base niobium wire is illustrated at 20. A number of bumps and humps 22 of niobium-tin compound are connected together by thinner areas 22*a* which vary in thickness from the overly-thick portions adjacent the bumps to bare portions 22*b*. As illustrated by the dotted arrows 30, the superconducting paths are along the thin portions 22*a* (having a thickness of a few angstroms to about 1000 angstroms) which extend between the bumps 22.

After the heat treating operation described above has been performed, it is preferred that a mechanical protective coating be provided over the niobium-tin layer. While the ductility of the niobium wire is not affected by the heat treating operation, the thin superconductive layer is a brittle material. It will flex with the niobium but for insurance a metallic protective coating should be provided.

It is preferred that a copper layer be electroplated for such mechanical protection. In order to prevent shorting during use at conventional temperatures, the copper must be protected by a conventional dielectric. For this purpose it is preferred that a fluorinated hydrocarbon be used because of its retained ductility at low temperatures.

Since certain changes may be made in the above product and process without departing from the scope of the invention herein involved, it is intended that all matter contained in the above description, or shown in the accompanying drawing, shall be interpreted as illustrative and not in a limiting sense.

What is claimed is:

In the process of forming a superconductor having high magnetic field tolerance which comprises providing a niobium surface of extended length, (*a*) treating said surface to make it wettable by molten tin, (*b*) applying a thin layer of tin to said surface and (*c*) heating the tin wetted surface to convert said tin layer to a stratum of $Nb_3Sn$ compound at the surface of the wire, wherein the surface of the niobium wire is made wettable in said step (*a*) by (*a'*) exposing the surface to tin vapors to form a molecular molten layer of tin on the niobium surface and (*a''*) heating the said surface at an elevated temperature to convert said molecular layer of molten tin to $Nb_3Sn$ prior to said step (*b*).

References Cited by the Examiner

UNITED STATES PATENTS

| | | | |
|---|---|---|---|
| 410,313 | 9/1889 | Coffin | 117—213 |
| 592,703 | 10/1897 | Gray | 174—126.2 |
| 2,733,168 | 1/1956 | Hodge et al. | 117—50 |
| 2,940,867 | 6/1960 | Streicher | 117—50 |
| 2,997,524 | 8/1961 | Ruskin | 174—126.2 |
| 3,031,330 | 4/1962 | Hornick et al. | 117—50 |
| 3,091,556 | 5/1963 | Behrndt et al. | 117—213 |
| 3,181,936 | 5/1965 | Denny et al. | |

FOREIGN PATENTS

| | | |
|---|---|---|
| 524,312 | 4/1956 | Canada. |

ALFRED L. LEAVITT, *Primary Examiner.*

LARAMIE E. ASKIN, *Examiner.*

RICHARD D. NEVIUS, MURRAY KATZ, A. ROSENSTEIN, *Assistant Examiners.*